(12) United States Patent
Fiegen et al.

(10) Patent No.: US 10,921,017 B2
(45) Date of Patent: Feb. 16, 2021

(54) SYSTEMS, APARATUSES, AND METHODS OF AIR CIRCULATIONS USING COMPACT ECONOMIZERS

(71) Applicant: TRANE INTERNATIONAL INC., Davidson, NC (US)

(72) Inventors: Joseph J. Fiegen, La Crosse, WI (US); Lucas C. Szymanski, Holmen, WI (US); Dale A. Byers, Richmond, KY (US); James Eric Self, Versailles, KY (US)

(73) Assignee: TRANE INTERNATIONAL INC., Davidson, NC (US)

( * ) Notice: Subject to any disclaimer, the term of this patent is extended or adjusted under 35 U.S.C. 154(b) by 167 days.

(21) Appl. No.: 15/206,480

(22) Filed: Jul. 11, 2016

(65) Prior Publication Data

US 2017/0010017 A1    Jan. 12, 2017

Related U.S. Application Data

(60) Provisional application No. 62/190,691, filed on Jul. 9, 2015.

(51) Int. Cl.
| | |
|---|---|
| *F24F 13/04* | (2006.01) |
| *F24F 7/06* | (2006.01) |
| *F24F 13/28* | (2006.01) |
| *F24F 13/15* | (2006.01) |
| *F24F 11/77* | (2018.01) |
| *F24F 7/00* | (2006.01) |
| *F24F 11/00* | (2018.01) |

(52) U.S. Cl.
CPC .............. *F24F 13/04* (2013.01); *F24F 7/065* (2013.01); *F24F 11/77* (2018.01); *F24F 13/15* (2013.01); *F24F 13/28* (2013.01); *F24F 2007/001* (2013.01); *F24F 2011/0002* (2013.01); *F24F 2221/16* (2013.01); *Y02B 30/70* (2013.01)

(58) Field of Classification Search
CPC .. F24F 13/04; F24F 13/15; F24F 13/28; F24F 7/065; F24F 11/0079; F24F 12/006
See application file for complete search history.

(56) References Cited

U.S. PATENT DOCUMENTS

| | | | | |
|---|---|---|---|---|
| 41,993 | A * | 3/1864 | Harvey ................. | F24F 12/006 237/46 |
| 273,589 | A * | 3/1883 | Ormsby ................ | F24F 12/006 237/46 |
| 568,954 | A * | 10/1896 | Marble ................. | F24F 12/006 237/46 |

(Continued)

*Primary Examiner* — Avinash A Savani
*Assistant Examiner* — Martha M Becton
(74) *Attorney, Agent, or Firm* — Hamre, Schumann, Mueller & Larson, P.C.

(57) ABSTRACT

An air circulation circuit including components that are in fluid communication. An air return connection is disposed downstream of the indoor space wherein the air return connection is configured to deliver an air stream from the indoor space to an economizer. The economizer is disposed downstream of the air return connection. The economizer is configured to exhaust a portion of the air stream. The economizer is configured to take in an amount of fresh air to mix with the air stream. The economizer further includes an air return fan disposed inside of the economizer to facilitate a flow of the air stream.

21 Claims, 7 Drawing Sheets

(56) References Cited

U.S. PATENT DOCUMENTS

| | | | | |
|---|---|---|---|---|
| 574,619 A * | 1/1897 | Miller | F24F 12/006 | 237/46 |
| 2,266,219 A * | 12/1941 | Larriva | F24F 3/1423 | 62/92 |
| 2,566,366 A * | 9/1951 | Pennington | F24F 3/1423 | 62/310 |
| 2,700,537 A * | 1/1955 | Pennington | F24F 3/1423 | 261/83 |
| 2,723,837 A * | 11/1955 | Pennington | F24F 3/1423 | 165/229 |
| 2,792,071 A * | 5/1957 | Pennington | F24F 3/1423 | 96/118 |
| 2,807,258 A * | 9/1957 | Pennington | F24F 3/1423 | 126/113 |
| 3,398,510 A * | 8/1968 | Pennington | F24F 3/1423 | 96/115 |
| 4,048,811 A * | 9/1977 | Ito | F24F 3/1423 | 62/263 |
| 4,100,763 A * | 7/1978 | Brody | F24D 11/0285 | 62/238.6 |
| 4,139,052 A * | 2/1979 | Lackey | F24F 1/02 | 165/137 |
| 4,210,278 A * | 7/1980 | Obler | F24F 11/30 | 236/49.3 |
| 4,389,853 A * | 6/1983 | Hile | F25D 16/00 | 62/89 |
| 4,404,815 A * | 9/1983 | Gilson | F24F 11/085 | 236/1 EA |
| 4,519,539 A * | 5/1985 | Bussjager | F24F 1/022 | 236/13 |
| 4,537,035 A * | 8/1985 | Stiles | F24F 1/022 | 165/250 |
| 4,911,234 A * | 3/1990 | Heberer | F24F 1/022 | 165/125 |
| 5,024,263 A * | 6/1991 | Laine | F24F 13/15 | 165/283 |
| 5,324,229 A * | 6/1994 | Weisbecker | F24F 13/04 | 236/49.3 |
| 5,348,077 A * | 9/1994 | Hillman | F24F 11/81 | 165/249 |
| 5,372,182 A * | 12/1994 | Gore | F24F 1/02 | 165/137 |
| 5,423,187 A * | 6/1995 | Fournier | F24F 3/1423 | 165/248 |
| 5,447,037 A * | 9/1995 | Bishop | F24F 3/044 | 62/89 |
| 5,490,557 A * | 2/1996 | Taylor | F24F 12/006 | 165/54 |
| 5,515,909 A * | 5/1996 | Tanaka | F28D 19/00 | 165/4 |
| 5,533,348 A * | 7/1996 | Baldwin | G01K 3/06 | 62/129 |
| 5,548,970 A * | 8/1996 | Cunningham, Jr. | F24F 3/1423 | 62/271 |
| 5,632,954 A * | 5/1997 | Coellner | A61L 9/01 | 165/8 |
| 5,752,323 A * | 5/1998 | Hashimoto | D06F 58/10 | 34/80 |
| 5,826,641 A * | 10/1998 | Bierwirth | F24F 3/1411 | 165/48.1 |
| 6,004,384 A * | 12/1999 | Caudle | B01D 53/261 | 55/502 |
| 6,006,142 A * | 12/1999 | Seem | F24F 11/0086 | 700/276 |
| 6,209,622 B1 * | 4/2001 | Lagace | F24F 3/1423 | 165/8 |
| 6,346,041 B1 * | 2/2002 | Desmond | F24F 11/74 | 454/268 |
| 6,347,527 B1 * | 2/2002 | Bailey | F24F 3/001 | 165/45 |
| 6,574,975 B2 * | 6/2003 | Bourne | F24F 5/0035 | 62/171 |
| 6,629,886 B1 * | 10/2003 | Estepp | F24F 11/745 | 454/229 |
| 6,684,653 B2 * | 2/2004 | Des Champs | F24F 1/027 | 62/186 |
| 6,751,964 B2 * | 6/2004 | Fischer | F24F 3/1423 | 62/271 |
| 6,779,735 B1 * | 8/2004 | Onstott | F24F 12/006 | 165/248 |
| 6,889,750 B2 * | 5/2005 | Lagace | F24F 3/1423 | 165/8 |
| 7,073,566 B2 * | 7/2006 | Lagace | F24F 3/1423 | 165/8 |
| 7,331,853 B2 * | 2/2008 | Lee | F24F 12/006 | 454/237 |
| 7,841,381 B2 * | 11/2010 | Chagnot | F24F 12/006 | 165/54 |
| 8,360,834 B1 * | 1/2013 | Semmes | F24F 13/20 | 454/242 |
| 8,364,318 B2 * | 1/2013 | Grabinger | F24F 11/0001 | 700/276 |
| 8,621,884 B2 * | 1/2014 | Stammer | F24F 1/022 | 62/409 |
| 8,746,327 B2 * | 6/2014 | Mooij | F28D 9/0037 | 165/103 |
| 8,939,827 B2 * | 1/2015 | Boudreau | F24F 12/006 | 454/252 |
| 8,943,848 B2 * | 2/2015 | Phannavong | F24F 12/001 | 62/160 |
| 9,021,821 B2 * | 5/2015 | Dunnavant | F24F 3/14 | 62/176.1 |
| 9,057,553 B1 * | 6/2015 | Metzger | F25D 17/06 | |
| 9,175,872 B2 * | 11/2015 | McKie | F24F 11/0079 | |
| 9,255,720 B2 * | 2/2016 | Thomle | F24F 12/006 | |
| 9,261,290 B2 * | 2/2016 | Storm | F24F 12/006 | |
| 9,441,843 B2 * | 9/2016 | McKie | F24F 3/044 | |
| 9,470,432 B2 * | 10/2016 | Stenfors | F24F 12/006 | |
| 9,551,502 B2 * | 1/2017 | Kim | F24F 13/105 | |
| 9,664,454 B2 * | 5/2017 | Stenfors | F24F 12/006 | |
| 9,765,986 B2 * | 9/2017 | Thomle | F24F 12/006 | |
| 9,816,724 B2 * | 11/2017 | Phannavong | F24F 12/001 | |
| 9,976,767 B2 * | 5/2018 | Roos | F24F 13/30 | |
| 10,041,743 B2 * | 8/2018 | Heberer | F24F 12/006 | |
| 10,203,122 B2 * | 2/2019 | Hasegawa | F24F 11/89 | |
| 10,337,759 B2 * | 7/2019 | McKie | F24F 12/001 | |
| 10,495,341 B2 * | 12/2019 | Hashino | F24F 11/77 | |
| 10,502,445 B2 * | 12/2019 | Matambo | F24F 13/12 | |
| 10,670,288 B2 * | 6/2020 | Thomle | F24F 11/62 | |
| 2002/0017107 A1 * | 2/2002 | Bailey | F24F 12/003 | 62/238.7 |
| 2002/0073720 A1 * | 6/2002 | Bourne | F24F 5/0035 | 62/171 |
| 2003/0181158 A1 * | 9/2003 | Schell | F24F 3/0442 | 454/229 |
| 2004/0000152 A1 * | 1/2004 | Fischer | F24F 3/1423 | 62/94 |
| 2005/0236150 A1 * | 10/2005 | Chagnot | F24F 12/006 | 165/222 |
| 2006/0199512 A1 * | 9/2006 | Lee | F24F 13/30 | 454/237 |
| 2006/0201182 A1 * | 9/2006 | Moon | F24F 6/00 | 62/271 |
| 2006/0273183 A1 * | 12/2006 | Cavanagh | F24F 3/153 | 236/44 C |
| 2007/0205297 A1 * | 9/2007 | Finkam | F24F 11/74 | 236/1 C |
| 2009/0029642 A1 * | 1/2009 | Martel | F24F 12/006 | 454/358 |
| 2010/0101764 A1 * | 4/2010 | Yang | F28D 9/0062 | 165/104.31 |
| 2010/0122794 A1 * | 5/2010 | Mooij | F28F 27/02 | 165/67 |
| 2010/0286831 A1 * | 11/2010 | Boudreau | F24F 12/006 | 700/278 |
| 2011/0076933 A1 * | 3/2011 | Stenfors | F24F 12/006 | 454/237 |

(56) References Cited

U.S. PATENT DOCUMENTS

| | | | |
|---|---|---|---|
| 2011/0076934 A1* | 3/2011 | Stenfors | F24F 12/006 454/239 |
| 2011/0097988 A1* | 4/2011 | Lord | F24F 11/77 454/256 |
| 2011/0264275 A1* | 10/2011 | Thomle | F24F 11/30 700/276 |
| 2011/0308265 A1* | 12/2011 | Phannavong | F24F 12/006 62/160 |
| 2012/0253526 A1* | 10/2012 | Storm | F24F 12/006 700/278 |
| 2013/0040549 A1* | 2/2013 | Douglas | F24F 13/1413 454/239 |
| 2013/0092344 A1* | 4/2013 | McKie | F24F 13/0272 165/4 |
| 2013/0092346 A1* | 4/2013 | McKie | F24F 12/001 165/8 |
| 2013/0161403 A1* | 6/2013 | Douglas | F24F 11/001 236/49.3 |
| 2013/0282186 A1* | 10/2013 | Douglas | G05D 23/00 700/277 |
| 2014/0041401 A1* | 2/2014 | Douglas | F25B 43/00 62/89 |
| 2014/0190037 A1* | 7/2014 | Erb | F24F 3/147 34/474 |
| 2014/0190656 A1* | 7/2014 | Heberer | F24F 12/006 165/4 |
| 2014/0199938 A1* | 7/2014 | Badenhorst | E04F 17/04 454/342 |
| 2014/0213169 A1* | 7/2014 | Rasmussen | H05K 7/1497 454/237 |
| 2014/0248831 A1* | 9/2014 | Kim | F24F 13/105 454/239 |
| 2014/0371918 A1* | 12/2014 | Douglas | F24F 11/0009 700/276 |
| 2015/0198350 A1* | 7/2015 | Phannavong | F24F 11/62 62/89 |
| 2015/0253024 A1* | 9/2015 | Murakami | F24F 11/30 165/251 |
| 2015/0354845 A1* | 12/2015 | Brown | F24F 13/10 165/237 |
| 2015/0377507 A1* | 12/2015 | Thomple | F24F 11/62 700/276 |
| 2016/0161139 A1* | 6/2016 | Asmus | F24F 11/0012 165/208 |
| 2016/0231016 A1* | 8/2016 | Roos | F24F 12/006 |
| 2016/0290675 A1* | 10/2016 | Hashino | F24F 11/83 |
| 2016/0348938 A1* | 12/2016 | Simon | F24F 11/62 |
| 2016/0377315 A1* | 12/2016 | McKie | F24F 3/044 454/241 |
| 2017/0108231 A1* | 4/2017 | Hasegawa | F24F 7/08 |
| 2017/0336150 A1* | 11/2017 | Stenfors | F24F 12/006 |
| 2017/0356661 A1* | 12/2017 | Fischer | F24F 3/147 |
| 2018/0010820 A1* | 1/2018 | Hirsch | F28D 9/0037 |
| 2018/0017276 A1* | 1/2018 | Thomle | F24F 11/62 |
| 2018/0051903 A1* | 2/2018 | Monk | F24F 12/006 |
| 2018/0119981 A1* | 5/2018 | Phannavong | F24F 3/1423 |
| 2018/0313614 A1* | 11/2018 | Heberer | F24F 12/006 |
| 2018/0335220 A1* | 11/2018 | Matambo | F24F 13/12 |
| 2020/0064008 A1* | 2/2020 | Matambo | F24F 1/0007 |
| 2020/0064012 A1* | 2/2020 | Hashino | F24F 11/62 |

\* cited by examiner

SYSTEMS, APARATUSES, AND METHODS OF AIR CIRCULATIONS USING COMPACT ECONOMIZERS

FIELD

This disclosure relates generally to systems, apparatuses, and methods of air circulation, for example, a heating, ventilating, and air conditioning (HVAC) system. More specifically, the disclosure relates to systems, apparatuses, and methods of air circulation using compact economizers.

BACKGROUND

Air circulation is designed to improve air quality of an indoor space. An air circulation circuit may be designed to maintain the temperature of an indoor space. An air circulation circuit may also be designed to maintain oxygen/carbon dioxide compositions of the air in the indoor space. An air circulation circuit may also be designed to remove odor or disinfect the air in the indoor space. An air circulation circuit may involve exchange of indoor air with ambient air. In an air circulation circuit, mechanical forces, e.g., fans, may be used to facilitate the flow of the air stream.

SUMMARY

This disclosure relates generally to systems, apparatuses, and methods of air circulation, for example, a heating, ventilating, and air conditioning (HVAC) system. More specifically, the disclosure relates to systems, apparatuses, and methods of air circulation using compact economizers.

In an air circulation circuit, an economizer may be used to improve the indoor air quality. An economizer may receive an air stream returned from an indoor space. The economizer may further allow a portion of the air stream returned from the indoor space to be exhausted out of the economizer. The economizer may further allow a certain amount of fresh air, e.g., ambient air, to enter the economizer and mix with the air stream. This air exchange process, e.g. the amount of return air to be exhausted and the amount of fresh air to be mixed, performed by the economizer may be controlled such that the air quality is maintained at a desired level. The control of the air exchange process may involve using fans, dampers, damper motors, controllers, sensors, etc.

In some situations, an economizer is installed on top of a building, e.g., roof top. The square footage of the roof top, in some circumstances, may be limited and a compact economizer disclosed in this disclosure may become desired to fit within the limited square footage. In some other situations, an economizer is installed in an indoor space, e.g., a mechanical room of a building. The indoor space may be limited and a compact economizer disclosed in this disclosure may become desired to fit into the limited indoor space.

The different embodiments of the compact size economizers disclosed herein may provide other benefits, for example, less labor, less time consuming, and less cost to install such compact economizers. Further, a compact size economizer may also be useful for retrofitting an existing air circulation circuit to improve the air quality control.

The embodiments disclosed in this specification include systems, apparatuses, and methods of using a compact size economizer. One example to achieve a compact size economizer may involve disposing an air return fan within an economizer plenum, wherein the air return fan is used to facilitate a flow of an air stream from an indoor space to the economizer.

Another example to construct a compact size economizer is to overlap a return chamber with an air mixing chamber in a direction of the flow of the air stream. Another example to construct a compact size economizer is to overlap an air return exhaust and a fresh air inlet such that the overall size of the economizer plenum is reduced.

In one embodiment, an economizer includes an economizer plenum. The economizer includes a partition member separating the economizer plenum into a return chamber and a mixing chamber. The return chamber and the mixing chamber are fluidically connected. The economizer includes a return air fan disposed within the return chamber. The economizer includes an air return inlet disposed within the return chamber, an air exhaust outlet disposed within the return chamber, an air supply outlet disposed within the mixing chamber, and a fresh air inlet disposed within the mixing chamber.

In another embodiment, the partition member of the economizer includes an angled section such that the return chamber and the mixing chamber overlap each other in a flow direction of an air stream.

In yet another embodiment, the air exhaust outlet and the fresh air inlet of the economizer overlap each other in the flow direction of the air stream.

In one embodiment, an air circulation circuit includes an air return connection disposed downstream of an indoor space. The air return connection is configured to deliver an air stream from the indoor space to an economizer. The economizer disposed downstream of the air return connection includes an economizer plenum. The economizer includes a partition member separating the economizer plenum into a return chamber and a mixing chamber. The return chamber and the mixing chamber are fluidically connected. The economizer includes a return air fan disposed within the return chamber. The return air fan facilitates a flow of the air stream. The economizer includes an air return inlet disposed within the return chamber, an air exhaust outlet disposed within the return chamber, an air supply outlet disposed within the mixing chamber, and a fresh air inlet disposed within the mixing chamber. The air circulation circuit further includes an air conditioning unit disposed downstream of the economizer. The air conditioning unit is configured to provide a treatment to the air stream. The air circulation circuit includes an air supply connection disposed downstream of the air conditioning unit. The air supply connection is configured to deliver the air stream from the air conditioning unit to the indoor space.

In another embodiment, a method to conduct an air circulation circuit includes following steps: receiving an air stream from an indoor space to an economizer plenum, facilitating a flow of the air stream with an air return fan, the air return fan being mounted within a return chamber of the economizer plenum, exhausting a portion of the air stream to be exhausted out of the economizer plenum from the return chamber, directing fresh air to mix with the air stream within a mixing chamber of the economizer plenum, delivering the air stream from the mixing chamber of the economizer to an air conditioning unit for treatment, and delivering the air stream to the indoor space, wherein the return chamber and the mixing chamber overlap with each other in a flow direction of the air stream.

DETAILED DESCRIPTION

Figure 1:
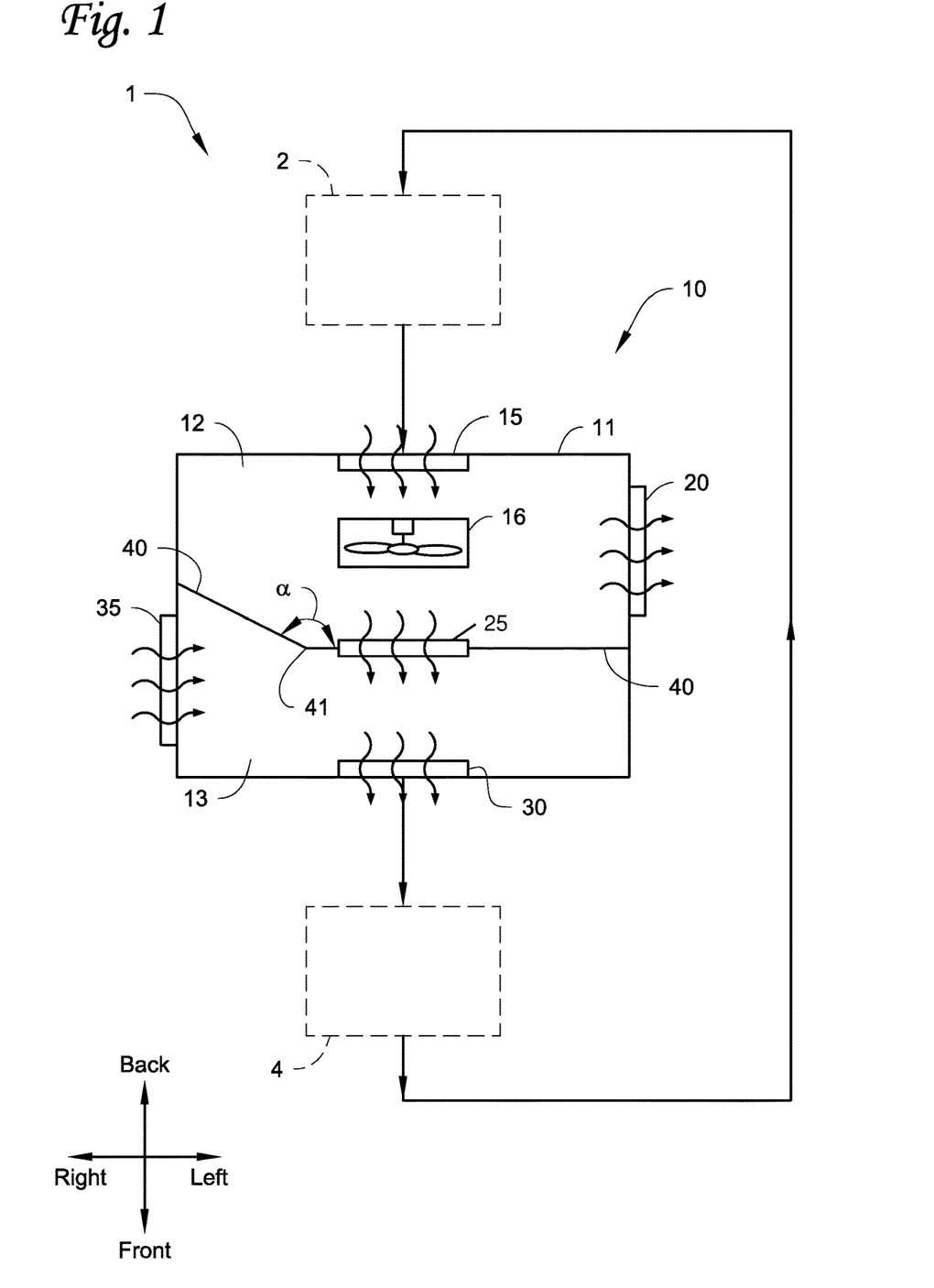
FIG. 1 illustrates a schematic diagram of an embodiment of an air circulation circuit using a compact economizer.

FIG. 1 illustrates a schematic diagram of an embodiment of an air circulation circuit 1 using a compact economizer. The air circulation circuit 1 can be applied to the air circulation circuit of a building shown in FIG. 2. The air circulation circuit 1 can be applied to different embodiments of compact economizers, e.g., the economizer shown in FIGS. 3A-3D.

As shown in FIG. 1, the air circulation circuit 1 includes an economizer 10. Optionally, the air circulation circuit includes an indoor space 2 and an air conditioning unit 4. Arrows in FIG. 1 indicates air flow directions.

As shown in FIG. 1, the economizer 10 includes an economizer plenum 11. The economizer 10 includes a return chamber 12 disposed within the economizer plenum 11. The return chamber 12 receives an air stream from the indoor space 2 through an air return inlet 15 disposed within the return chamber 12. The air return inlet 15 can be e.g., an air inlet port.

The economizer 10 includes an air return fan 16 disposed within the return chamber 12. The air return fan 16 facilitates the flow of the air stream.

The economizer 10 further includes an air exhaust outlet 20 disposed within the return chamber 12. The economizer 10 directs a portion of the air stream to be exhausted out of the economizer plenum 11 through the air exhaust outlet 20.

The economizer 10 further includes a mixing chamber 13 disposed within the economizer plenum 11. The mixing chamber 13 is fluidically connected to the return chamber 12 and receives an air stream from the return chamber 12 through an air communicating opening 25. A fresh air inlet 35 is disposed within the mixing chamber 13. The economizer 10 directs fresh air to enter the mixing chamber 13 through the fresh air inlet 35 to mix with the air stream inside the economizer plenum 11.

The economizer further includes a partition member 40 that separates the economizer plenum 11 into the return chamber 12 and the mixing chamber 13. In one embodiment, the partition member 40 includes an angled section 41, such that the return chamber and the mixing chamber overlap to each other in a flow direction of the air stream, for example in the direction of arrows across the partition member 40 and through opening 25. In another embodiment, the angled section 41 includes an angle α. In one embodiment, the angle α can be from at or about 90° to at or about 180°. In another embodiment, the angle α can be from at or about 110° to at or about 160°. In yet another embodiment, the angle α can be: at or about 90° to at or about 110°; at or about 90° to at or about 160°; at or about 110° to at or about 180°; at or about 160° to at or about 180°. In an embodiment, the angle α can be: at or about 135°; at or about 90° to at or about 135°; at or about 135° to at or about 180°. In an embodiment, the angle α can be an obtuse angle as shown in the drawings, for example more than 90° and less than 180°.

In one embodiment, the angled section 41 may be a joint, e.g., the joint 241 shown in FIGS. 3A-3D.

In one embodiment, the air exhaust outlet 20 and the fresh air inlet 35 overlap each other in a flow direction of the air stream.

The economizer 10 directs the mixed air out of the economizer plenum 11 through an air supply outlet 30.

It is noted that the arrangement of the air exhaust outlet 20 and the fresh air inlet 35 is not limited to the left-right arrangement as shown in FIG. 1. In some embodiments, the air exhaust outlet 20 and the fresh air inlet 35 can be arranged on a same side of the economizer plenum 11. In such embodiments, the air exhaust outlet 20 and the fresh air inlet 35 do not overlap to each other in a flow direction of the air stream. However, in such embodiments, the return chamber 12 and the mixing chamber 13 may still overlap to each other in a flow direction of the air stream.

For example, in one embodiment, the air exhaust outlet 20 and the fresh air inlet 35 can be arranged on the back side of the economizer plenum 11. The air exhaust outlet 20 may be disposed on a lower portion of the back side of the economizer plenum 11. The fresh air inlet 35 may be disposed on an upper portion of the back side of the economizer plenum 11. The air exhaust outlet 20 and the fresh air inlet 35 do not overlap to each other in a flow direction of the air stream. The partition member 40 includes an angled section 41. The partition member 40 separates the economizer plenum 11 in a top to bottom manner such that the return chamber 12 and the mixing chamber 13 overlap each other in a flow direction of the air stream.

Optionally, an air conditioning unit 4 is disposed downstream and receives an air stream from the economizer 10. The air conditioning unit 4 may further deliver a conditioned air stream to the indoor space 2.

It is noted, in an air circulation circuit application, the economizer 10 can be installed in any space suitable, e.g. outdoor and/or indoor. In one embodiment, the economizer 10 is installed outdoor, e.g., see FIG. 2 for a roof top installation embodiment. In another embodiment, the economizer 10 is installed indoor, e.g., a room in a building.

Figure 2:
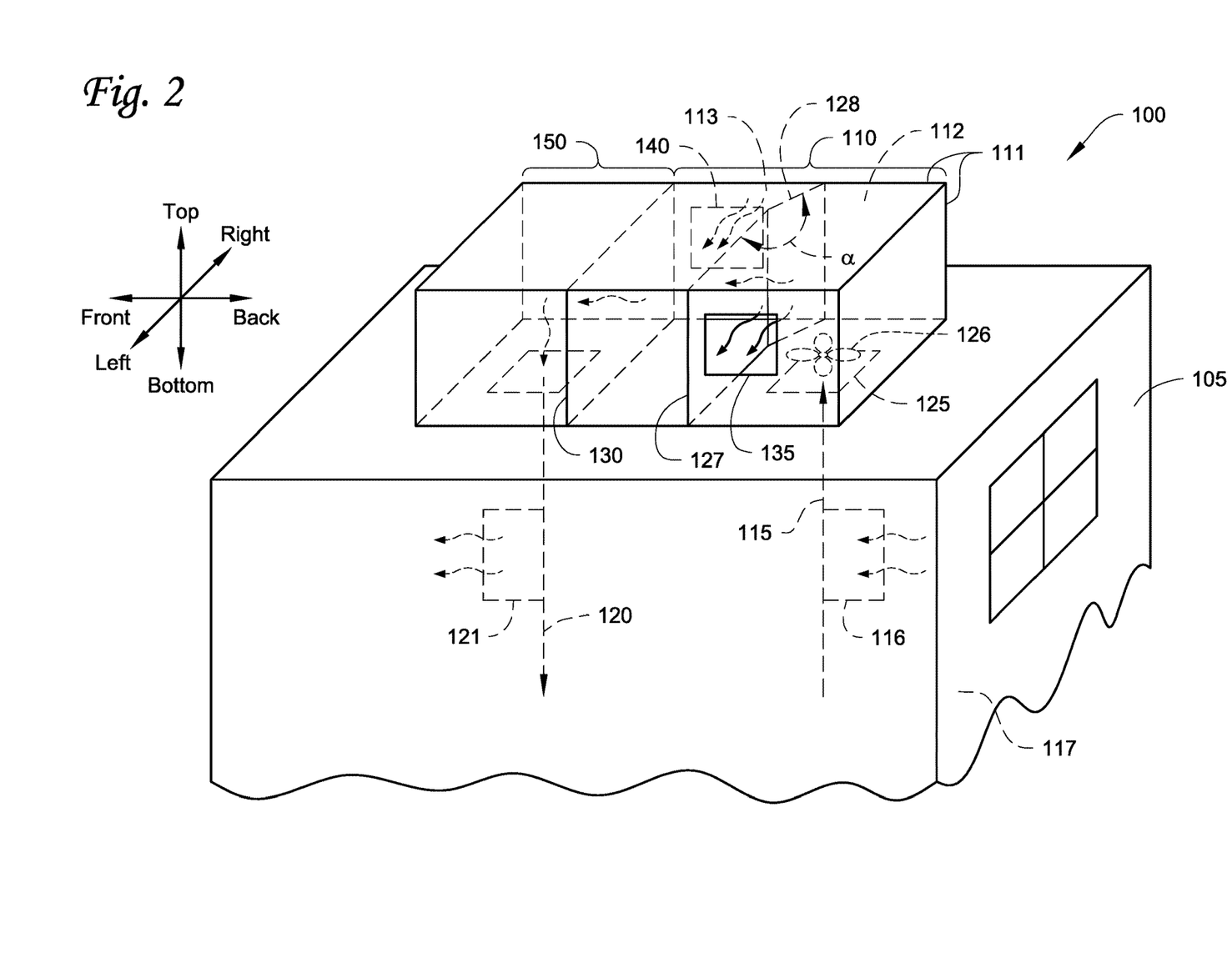
FIG. 2 illustrates an embodiment of an air circulation circuit of a building comprising an economizer installed on a rooftop.

FIG. 2 illustrates a schematic diagram of an embodiment of an air circulation circuit 100 of a building 105 comprising an economizer 110. The embodiment of an air circulation circuit 100 shown in FIG. 2 can be applied in the air circulation circuit 1 in FIG. 1. Further, the embodiment of an air circulation circuit 100 may include the economizer 200 shown in FIGS. 3A-3D. Moreover, the embodiment of the air circulation circuit 100 may utilize the method 300 shown in FIG. 4.

Arrows shown in FIG. 2 indicate directions of air streams. FIG. 2 shows an air circulation circuit 100 of a building 105. The components of the air circulation circuit 100 are in appropriate fluid communication.

An indoor space 117 is disposed upstream of an economizer 110. The economizer 110 is disposed upstream of an air conditioning unit 150. The air conditioning unit 150 is disposed upstream of the indoor space 117, forming an air circulation circuit 100.

As shown in FIG. 2, the economizer 110 includes an economizer plenum 111. The economizer plenum further includes a return chamber 112 and a mixing chamber 113. The economizer may include a partition member that separates the economizer plenum 111 into the return chamber 112 and the mixing chamber 113. In one embodiment, the partition member includes a first 128 and a second 127 separating members joined together at an angle α to separate the economizer plenum 111 into the return chamber 112 and the mixing chamber 113.

The economizer plenum 111 includes a fresh air inlet 140 disposed within the mixing chamber 113. The fresh air inlet 140 is configured to allow fresh air to enter the economizer 110 and mix with the air stream inside the economizer 110. The economizer plenum 111 includes an air exhaust outlet 135 disposed within the return chamber 112. The air exhaust outlet 135 allows a portion or the entire air stream returned from the indoor space 117 to exit the economizer 110.

An air return fan 126 is disposed within the return chamber 112 to facilitate a flow of the air stream.

As shown in FIG. 2, an economizer 110 is mounted on the top of a building 105. The economizer 110 has an economizer air return inlet 125 connected to an air return connection 115, e.g., an air duct. The air return connection 115 delivers air streams from one or more indoor spaces 117 to the economizer 110. The air return connection 115 includes one or more indoor air return openings 116.

As shown in FIG. 2, the economizer 110 includes an economizer air supply outlet 130. The economizer air supply outlet 130 is fluidically connected to an air conditioning unit 150. The air conditioning unit 150 may include coils, supply fan, discharge plenum, sound dispersing materials, etc. The air conditioning unit 150 may provide a treatment to the air stream, wherein the treatment is at least one selected from the following: cooling, heating, dehumidifying, filtering, and disinfecting. The air conditioning unit 150 delivers the conditioned air streams to indoor spaces 117 through air supply connection 120. The air supply connection 120 includes one or more indoor air supply openings 121. The indoor air supply opening 121 fluidically connects the air supply connection and indoor spaces 117.

In the embodiment shown in FIG. 2 the air return inlet 125 is disposed at the bottom of the economizer 110. It is noted that the air return inlet 125 is not limited to be disposed at a specific location within the economizer 110. In one embodiment, the air return inlet 125 may be disposed at any side of the economizer 110, e.g., the back side and/or the top side of the economizer (see e.g. FIGS. 3C-D).

As shown in the embodiment of FIG. 2, the economizer includes one air return fan 126 mounted inside the economizer 110. In another embodiment, the economizer may include more than one air return fans 126 disposed within the return chamber 112.

As shown in the embodiment of FIG. 2, the air return fan is disposed at the bottom of the economizer 110. In another embodiment, the air return inlet 125 may be disposed at any side of the economizer 110, e.g., back side and/or top side.

In FIG. 2, the economizer 110 includes an air exhaust outlet 135. The air exhaust outlet 135 allows a portion or the entire air stream from the air return connection 115 to be exhausted out of the economizer 110. The amount of the air stream to be exhausted may be controlled by a controller through one or more actuators, e.g. dampers, fans, etc. It is noted the economizer 110 may have more than one air exhaust outlet 135.

In FIG. 2, the economizer 110 includes a fresh air inlet 140. The fresh air inlet 140 allows an amount of air outside of the economizer 110, e.g., fresh air, to enter into the economizer 110 to mix with the air stream. The mixed air stream is subsequently delivered to the air conditioning unit 150 for air conditioning, e.g. heating, cooling, dehumidifying, etc. The amount of the air outside of the economizer 110 entering the economizer 110 can be controlled by a controller through one or more actuators, e.g. dampers, fans, etc.

As shown in FIG. 2, the economizer 110 is fluidically connected to the air conditioning unit 150. As shown in FIG. 2, the air stream exits the economizer 110 through the economizer air supply outlet 130 entering the air conditioning unit 150.

The air conditioning unit 150 may provide the following treatments to the air stream, including but not limited to, cooling, heating, dehumidifying, filtering, disinfecting, etc. In one embodiment, the air conditioning unit 150 may include an air supply fan, which generates a negative pressure in the economizer 110 and facilitates a flow of the air stream.

As shown in FIG. 2, the air conditioning unit 150 is disposed upstream of the indoor space 117. The air conditioning unit 150 delivers the conditioned air stream, e.g. cooled or heated air, to the indoor space 117 through the air supply connection 120, which may be for example an air duct(s).

As shown in FIG. 2, the air supply connection 120 includes at least one indoor air supply opening 121. The indoor air supply opening 121 is an opening of the air supply connection 120 that fluidically connects the air supply connection 120 and the indoor space 117.

FIGS. 3A-3D illustrate embodiments of an economizer 200. The economizer 200 shown in FIGS. 3A-3D can be the economizer 10 shown in FIG. 1 and/or the economizer 110 shown in FIG. 2. The economizer 200 can also be used in the method 300 shown in FIG. 4.

Figure 3A:
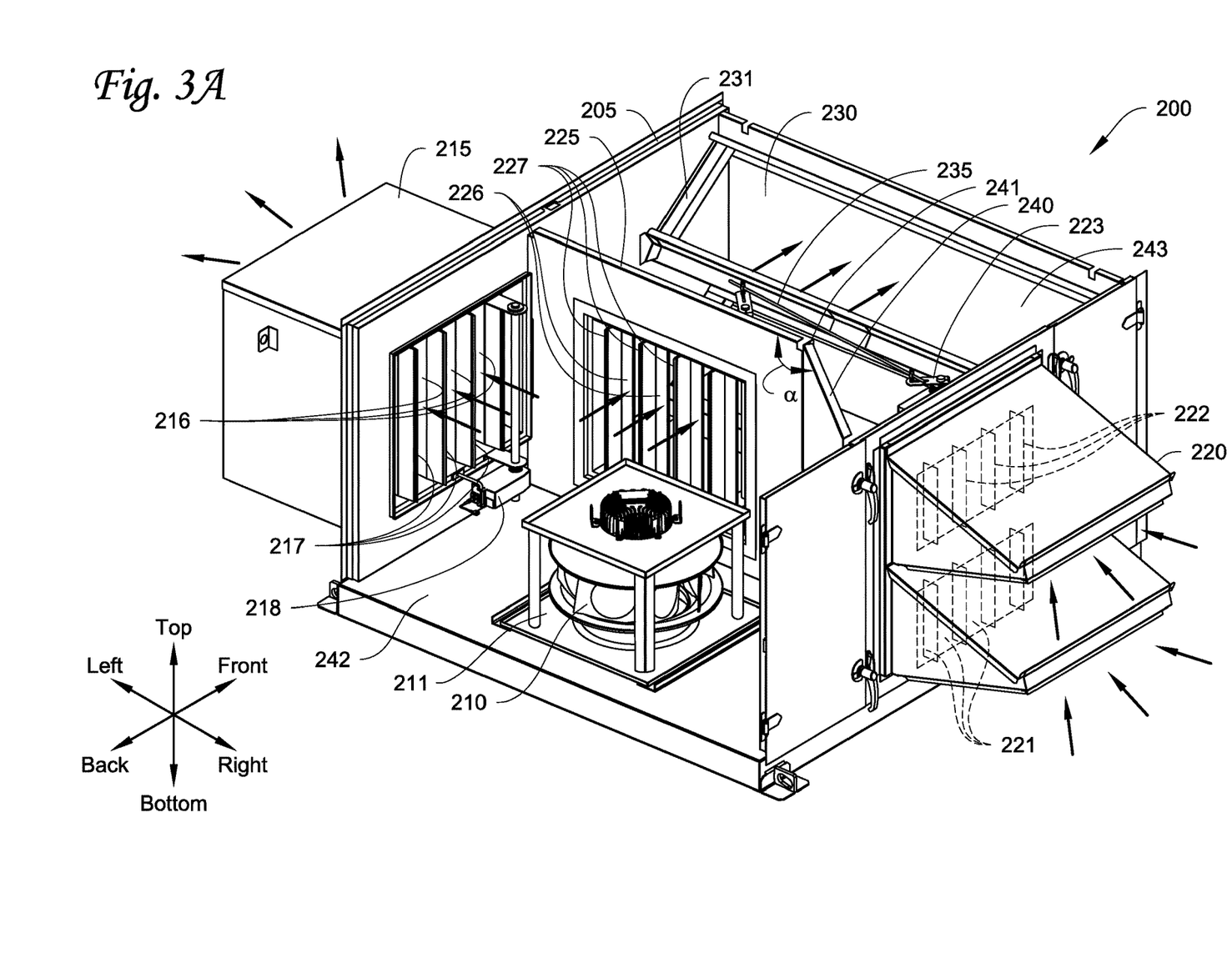
FIGS. 3A-B illustrate an embodiment of an economizer.
Figure 3B:
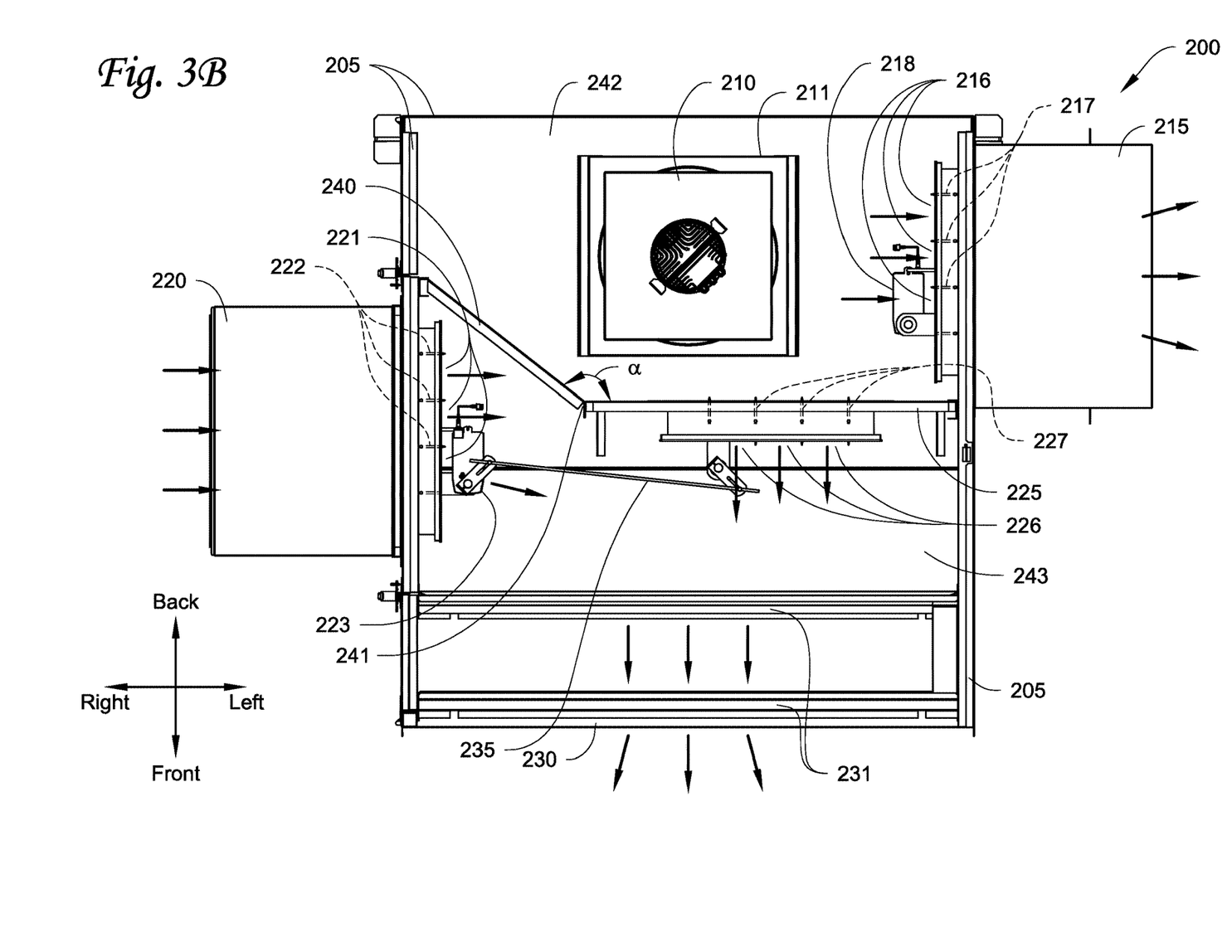

FIG. 3A shows a perspective view of the economizer 200. FIG. 3B shows a top view of the economizer 200. Like number in FIGS. 3A-3B refer to like parts. Arrows in FIGS. 3A-B indicate direction of the air flow.

As shown in FIGS. 3A-3B, the economizer includes an economizer plenum 205. The economizer 200 includes an air return fan 210 disposed within the economizer plenum 205. The air return fan 210 is disposed at the bottom of the economizer plenum 205 and aligned to an air return inlet 211. The air return fan 210 facilitates the movement of the air stream from air return inlet 211 to air supply outlet 230. The economizer 200 includes an air exhaust outlet 216. The air exhaust outlet 216 allows a portion or the entire air stream facilitated by the air return fan 210 to exit the economizer plenum 205. In one embodiment, the economizer 200 includes an air exhaust outlet housing 215 attached to the economizer plenum 205 and aligned to the air exhaust outlet 216. The air exhaust outlet housing 215 may include an air exhaust fan (not shown) to facilitate the exhaustion of air getting out of the economizer plenum 205. The economizer 200 further includes an air exhaust outlet damper 217, which regulates the amount of air exiting the economizer plenum 205. The air exhaust outlet damper 217 is actuated by an air exhaust outlet damper motor 218. The air exhaust outlet damper motor 218 may be further controlled by a controller (not shown).

The economizer 200 further includes a partition member. In one embodiment, as shown in FIG. 3A-3B, the partition member includes a first separating member 225 and a second separating member 240. The first separating member 225 and the second separating member joined together at a joint 241 with an angle α. The angle α allows the return chamber 242 and the mixing chamber 243 overlap with each other in a flow direction of the air stream. In one embodiment, the angle α can be from at or about 90° to at or about 180°. In another embodiment, the angle α can be from at or about 110° to at or about 160°. In yet another embodiment, the angle α can be: at or about 90° to at or about 110°; at or about 90° to at or about 160°; at or about 110° to at or about 180°; at or about 160° to at or about 180°. In an embodiment, the angle α can be: at or about 135°, at or about 90° to at or about 135°, at or about 135° to at or about 180°. In an embodiment, the angle α can be an obtuse angle as shown in the drawings, for example more than 90° and less than 180°. It is noted, when the angle α is 180°, the return chamber 242 and the mixing chamber 243 do not overlap with each other in the flow direction of the air stream.

As shown in FIG. 3A-3B, the fresh air inlet 221 overlaps with the air exhaust outlet 216 in the flow direction of the air stream. In another embodiment, the fresh air inlet 221 and the exhaust outlet 216 may be arranged such that they do not overlap with each other, e.g., by reducing the size of the fresh air inlet 221 and/or by reducing the size of the exhaust outlet 216.

As shown in FIG. 3A-3B, the first separating member 225 and the second separating member 240 divide the economizer plenum 205 into two separate but fluidically connected chambers, a return chamber 242, and a mixing chamber 243. The air exhaust outlet 217 is disposed within the return chamber 242. The fresh air inlet 221 is disposed within the mixing chamber 243.

As shown in FIGS. 3A-3B, the first separating member 225 includes a first separating member opening 226. The first separating member opening 226 is an opening on the first separating member 225 and fluidically connects the return chamber 242 and the mixing chamber 243. The first separating member 225 includes a first separating member damper 227. The first separating member damper 227 regulates the amount of the air flowing through the first separating member opening 226 from the return chamber 242 to the mixing chamber 243. In an embodiment, the first separating member damper 227 is actuated by a fresh air inlet motor 223 through a connecting bar 235. In an embodiment, the connecting bar 235 synchronizes the movements of the first separating member damper 227 and the fresh air inlet damper 222.

The economizer 200 includes a fresh air inlet 221. The fresh air inlet 221 allows fresh air to enter into the mixing chamber 243 and mix with the air stream inside of the economizer plenum 200. As shown, in an embodiment the amount of the air entering the mixing chamber 243 through the fresh air inlet 221 is regulated by the fresh air inlet damper 222. The fresh air inlet damper 222 is actuated by a fresh air inlet damper motor 223. The fresh air inlet damper motor 223 may be further controlled by a controller (not shown). In some embodiments, the economizer 200 includes a fresh air inlet housing 220 attached to the economizer plenum 205 and aligned to the fresh air inlet 221.

As shown in FIGS. 3A-3B, the economizer 200 includes an air supply outlet 230. The air supply outlet 230 allows the air stream to exit the economizer plenum 200 from the mixing chamber 243. In an embodiment, the economizer 200 includes an air supply outlet rack 231 disposed at the air supply outlet 230. In some embodiment, air filtering member(s), e.g., a filter, may be disposed on the air supply outlet rack 231.

As shown in FIGS. 3A-3B, in an embodiment, the fresh air inlet damper 222 and the first separating member damper 227 are connected through a connecting bar 235. The connecting bar 235 in an embodiment synchronizes movements of the fresh air inlet damper 222 and the first separating member damper 227, such that a certain volume percentage of the fresh air is mixed with the air stream in the mixing chamber 243. For example, such volume percentage can be controlled as [volume percentage of the air stream from the return chamber 242 to the mixing chamber 243: volume percentage of fresh air from ambient to the mixing chamber 243]=~100%:~0%, ~80%:~20%, ~60%:~40%, ~50%:~50%, ~40%:~60%, ~80%:~20%, ~0%:~100%, etc.

In the embodiment shown in FIGS. 3A-3B, the air return inlet 211 is disposed at the bottom of the economizer plenum 205. In this embodiment, the air return fan 210 is mounted at the bottom of the economizer plenum 205 and aligned to the air return inlet 211.

It is noted the air return inlet 211 is not limited to be disposed at the bottom of the economizer plenum 205. The economizer is typically upstream of the air conditioning unit and depending on the direction of airflow, the air return inlet 211 of the economizer can be disposed at any side of the economizer plenum 205, e.g., the back side, right side, left side, top side, and the front side with the air return fan 210 aligned inside of the economizer plenum 205. It is noted that in some embodiment, more than one air return fan 210 is disposed within the economizer plenum 205.

Figure 3C:
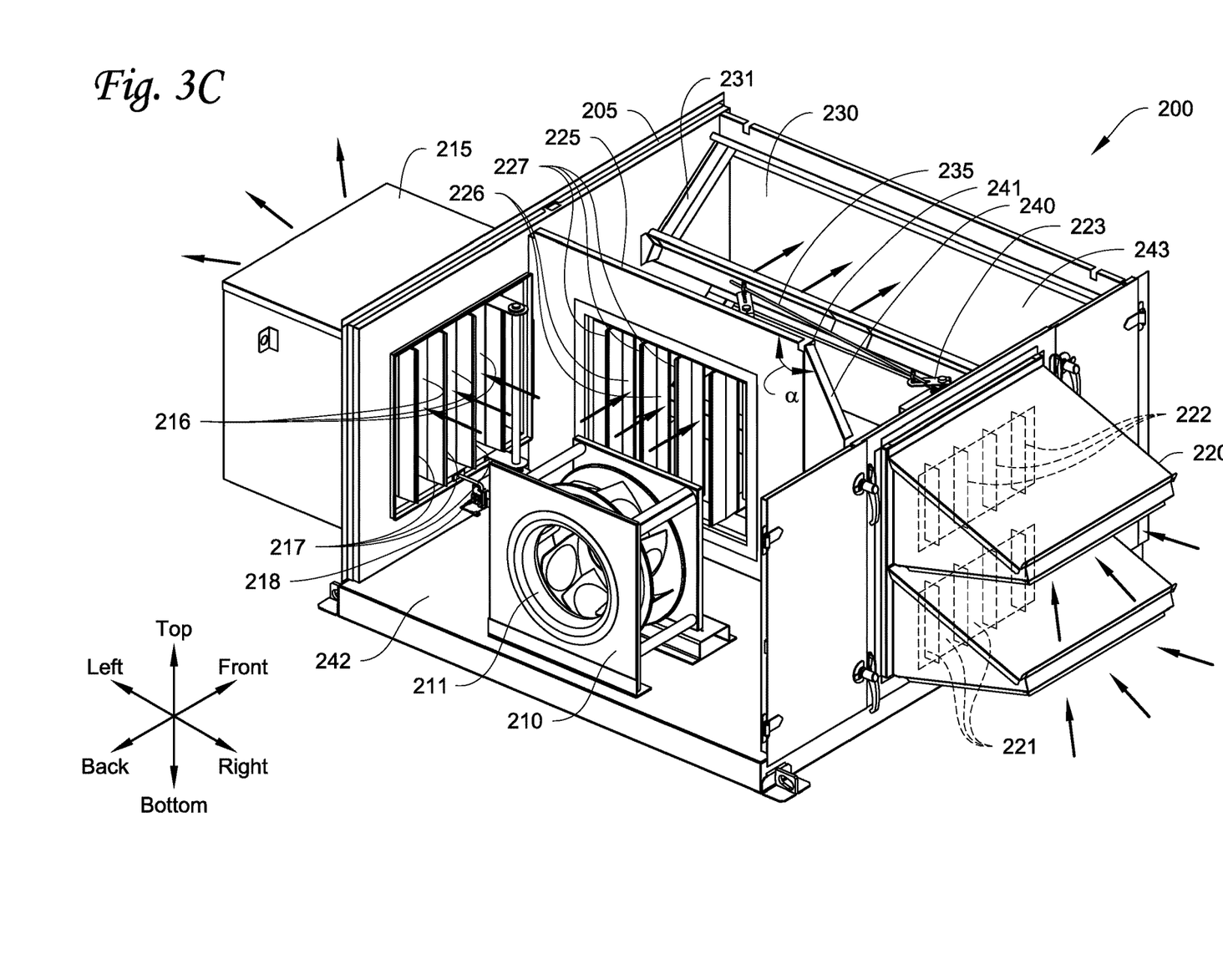
FIGS. 3C-D illustrate an embodiment of an economizer.
Figure 3D:
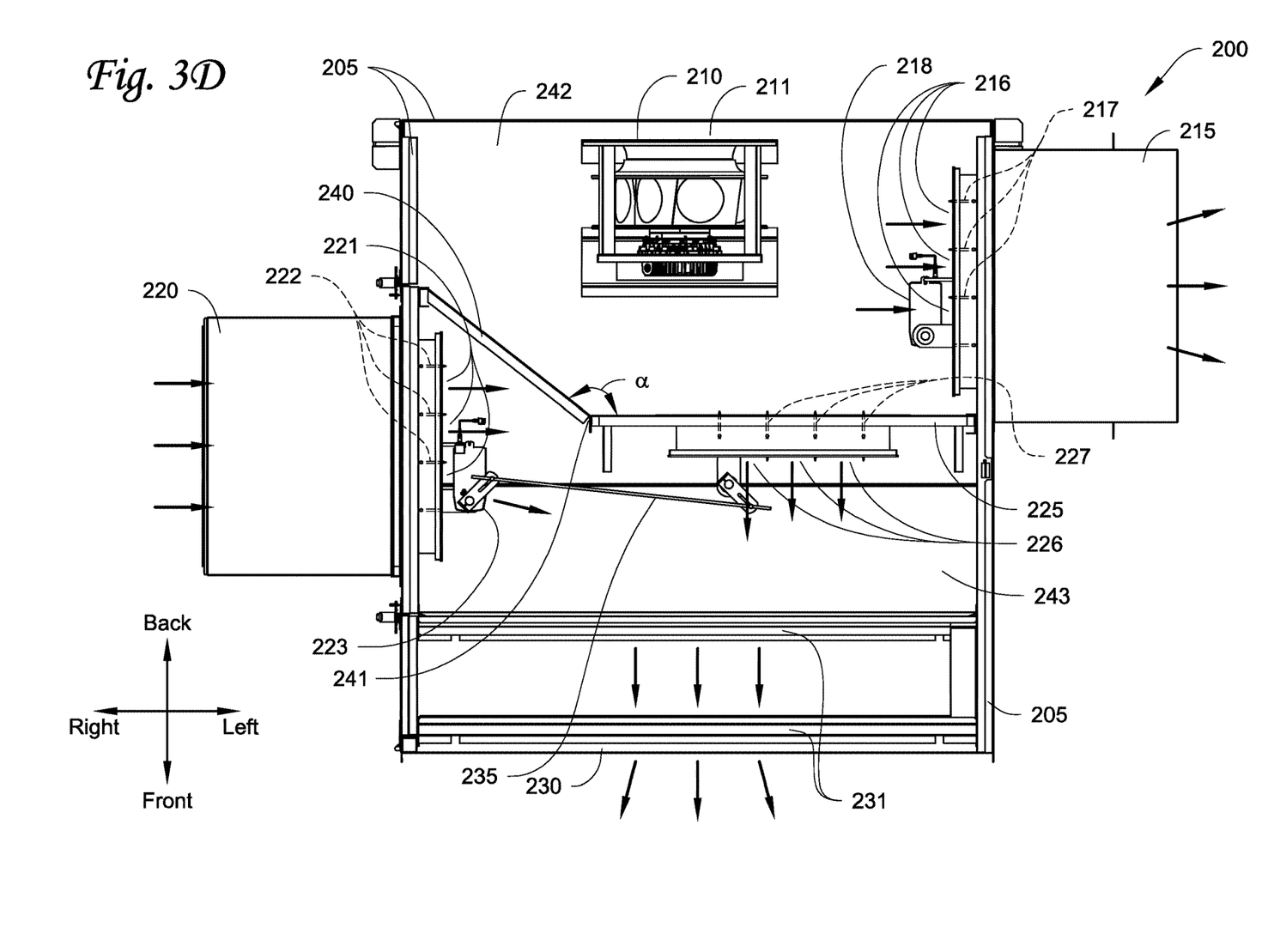

In FIGS. 3C-D, for example, in another embodiment, the air return inlet 211 can be disposed at the back side of the economizer plenum 205. In this embodiment, the air return fan 210 can be mounted at the back side of the economizer plenum 205 and aligned inside of the economizer plenum 205 to the air return inlet 211. FIG. 3C shows a perspective view of the economizer 200. FIG. 3D shows a top view of the economizer 200. Like number in FIGS. 3C-3D refer to like parts as in FIGS. 3A-B. Arrows in FIGS. 3C-D indicate direction of the air flow.

For example, in another embodiment, the air return inlet 211 can be disposed at the right or left side of the economizer plenum 205. In this embodiment, the air return fan 210 can be mounted at the right or left side of the economizer plenum 205 and aligned inside of the economizer plenum 205 to the air return inlet 211.

For example, in another embodiment, the air return inlet 211 can be disposed at the top side of the economizer plenum 205. In this embodiment, the air return fan 210 can be mounted at the top side of the economizer plenum 205 and aligned inside of the economizer plenum 205 to the air return inlet 211.

In the embodiment shown in FIGS. 3A-3B, the air return fan 210 is in a square-like frame. It is noted that the air return fan 210 is not limited to a square-like frame. For example, in another embodiment, the air return fan 210 can be in round-like frame.

In another embodiment, the economizer 200 may include one or more air exhaust outlets and air exhaust fans to facilitate the exit of air from the return chamber 242 to the ambient. The air exhaust fans may be disposed inside and/or outside of the economizer plenum 200 and may be aligned to the air exhaust outlets 216. In one embodiment, the one or more air exhaust fans may be disposed in the air exhaust outlet housing 215.

In another embodiment, the economizer 200 may include one or more fresh air inlets and fresh air fans to facilitate the inlet of fresh air from the ambient to the mixing chamber 243. The fresh air fans may be disposed inside and/or outside of the economizer plenum 200 and may be aligned to the fresh air inlets 221. In one embodiment, the fresh air fan may be disposed in the fresh air inlet housing 220.

It is noted that the air return fan 210, the air exhaust fan, the fresh air fan, and the supply air fan can be fix speed fans and/or variable speed fans. Each of the air return fan 210, the air exhaust fan, the fresh air fan, and the supply air fan can be controlled by a controller to turn on/off or change the speed of the fan. Such controls of the fans may be able to provide precise control of the air stream, e.g., the flow rate of air to be exhausted, the flow rate of the air supply, the flow rate of the fresh air to take in, etc.

In another embodiment, to facilitate the mixing of the fresh air (from ambient to the mixing chamber 243) and the air stream (from the return chamber 242 to the mixing chamber 243), the economizer 200 may include some mechanical structures in the mixing chamber 243 that facilitate the mixing, e.g. mesh-like structures, array-like tubes, etc. In yet another embodiment, to facilitate the mixing of the fresh air (from ambient to the mixing chamber 243) and the air stream (from the return chamber 242 to the mixing chamber 243), first separating member damper 227 and the fresh air inlet damper 222 may direct the flow of fresh air and the flow of the air stream at an angle. In yet another embodiment, to facilitate the mixing of the fresh air (from ambient to the mixing chamber 243) and the air stream (from the return chamber 242 to the mixing chamber 243), the angle α of the joint 241 may be set at a certain degree that facilitates the mixing.

Figure 4:
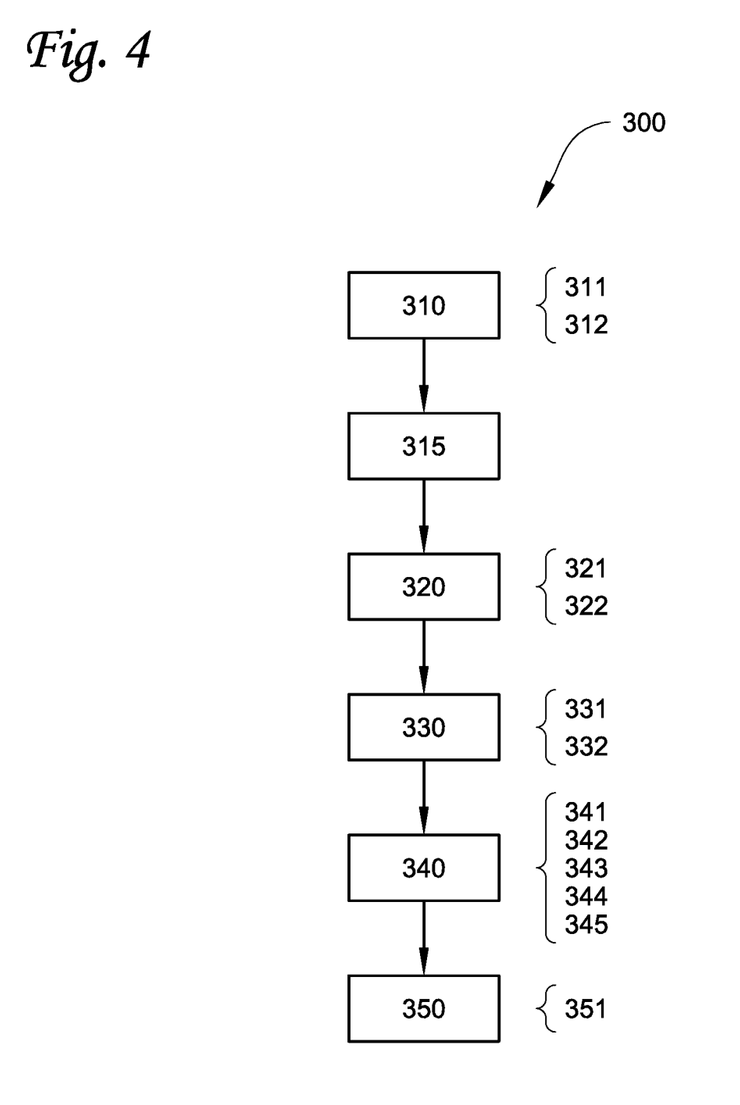
FIG. 4 illustrates an embodiment of a method to conduct an air circulation circuit.

FIG. 4 illustrates an embodiment of a method 300 to conduct an air circulation circuit. As shown in FIG. 4, the method 300 to conduct an air circulation circuit includes receiving an air stream from an indoor space to an economizer plenum 310, facilitating a flow of the air stream with an air return fan, the air return fan being disposed in a return chamber of the economizer plenum 315, exhausting a portion of the air stream out of the economizer plenum 320, injecting fresh air to mix with the air stream within the economizer plenum 330, delivering the air stream to an air conditioning unit for treatment 340, and delivering the air stream to the indoor space 350. In another embodiment, the return chamber and the mixing chamber may overlap with each other within the economizer plenum in a flow direction of the air stream. In yet another embodiment, the air exhaust outlet and the fresh air inlet overlap to each other in a flow direction of the air stream.

As shown in FIG. 4, the step of receiving an air stream from an indoor space to an economizer plenum 310 further includes facilitating a flow of the air stream with an air return fan, wherein the air return fan is mounted inside and at the bottom or side of the economizer plenum 311.

As shown in FIG. 4, the step of receiving an air stream from an indoor space to an economizer plenum 310 further includes facilitating a flow of the air stream with an air return fan, the air return fan is mounted inside and at the back side of the economizer plenum 312.

As shown in FIG. 4, the step of exhausting a portion of the air stream out of the economizer plenum 320 further includes separating the economizer plenum into a return chamber and a mixing chamber with a separating member that includes an angled section, wherein the return chamber and the mixing chamber are fluidically connected 321. The step of exhausting a portion of the air stream out of the economizer plenum 320 further includes disposing an air exhaust outlet within return chamber, wherein the air exhaust outlet is configured to allow the air stream to be exhausted out of the economizer plenum 322.

As shown in FIG. 4, the step of directing fresh air to mix with the air stream within the economizer plenum 330 further includes separating the economizer plenum into a return chamber and a mixing chamber, wherein the return chamber and the mixing chamber are fluidically connected 331. The step of directing fresh air to mix with the air stream within the economizer plenum 330 further includes disposing a fresh air inlet within the mixing chamber, the fresh air inlet being configured to allow the fresh air to enter the mixing chamber and mix with the air stream within the mixing chamber 332.

As shown in FIG. 4, the treatment in the step of delivering the air stream to an air conditioning unit for treatment 340 is at least one selected from the following: cooling 341, heating 342, dehumidifying 343, filtering 344, and disinfecting 345.

As shown in FIG. 4, the step of delivering the air stream to the indoor space 350 further includes facilitating a flow of the air stream with an air supply fan disposed downstream of the economizer plenum 351.

Aspects

It is noted that any of aspects 1-12 can be combined with any of aspects 13-20 and 21-27. Further, any of aspects 13-20 can be combined with any of aspects 21-27.

Aspect 1. An economizer, comprising
an economizer plenum,
a partition member separating the economizer plenum into a return chamber and a mixing chamber, the return chamber and the mixing chamber being fluidically connected,
a return air fan disposed within the return chamber,
an air return inlet disposed within the return chamber,
an air exhaust outlet disposed within the return chamber,
an air supply outlet disposed within the mixing chamber, and
a fresh air inlet disposed within the mixing chamber.

Aspect 2. The economizer according to aspect 1, wherein
the partition member includes an angled section such that the return chamber and the mixing chamber overlap to each other in a flow direction of an air stream.

Aspect 3. The economizer according to any one of aspects 1-2, wherein
the air exhaust outlet and the fresh air inlet overlap to each other in the flow direction of the air stream.

Aspect 4. The economizer according to any one of aspects 2, wherein the partition member further includes
a first separating member disposed inside of the economizer plenum, and
a second separating member disposed inside of the economizer plenum,
wherein the first separating member and the second separating member joined together at the angled section.

Aspect 5. The economizer according to any one of aspects 2-4, wherein
the angled section includes an angle from ~90 degree to ~180 degree.

Aspect 6. The economizer according to any one of aspects 1-5, further comprising
an air exhaust outlet damper, the air exhaust outlet damper being aligned to the air exhaust outlet to regulate the air stream flowing through the air exhaust outlet, and
an air exhaust outlet damper motor, the air exhaust outlet damper motor being configured to control a movement of the air exhaust outlet damper.

Aspect 7. The economizer according to any one of aspects 1-6, further comprising
an air exhaust outlet housing, the air exhaust outlet housing being aligned to the air exhaust outlet, the air exhaust outlet housing being configured to attach to an outside surface of the economizer plenum.

Aspect 8. The economizer according to any one of aspects 1-7, further comprising
a fresh air inlet damper, the fresh air inlet damper being aligned to the fresh air inlet to regulate the air stream flowing through the fresh air inlet, and a fresh air inlet damper motor, the fresh air inlet damper motor being configured to control a movement of the fresh air inlet damper.

Aspect 9. The economizer according to any one of aspects 1-8, further comprising
a fresh air inlet housing, the fresh air inlet housing being aligned to the fresh air inlet, the fresh air inlet housing being configured to attach to an outside surface of the economizer plenum.

Aspect 10. The economizer according to any one of aspects 1-9, further comprising
an air supply outlet rack disposed in the mixing chamber, and
an air filtering member disposed on the air supply outlet rack.

Aspect 11. The economizer according to any one of aspects 4-10, further comprising
a first separating member opening disposed on the first separating member, the first separating member opening allows the air stream to flow from the return chamber to the mixing chamber,
a first separating member damper aligned to the first separating member opening, the first separating member damper configured to regulate the air stream flowing through the first separating member opening.

Aspect 12. The economizer according to aspect 11, wherein
the first separating member damper is connected to the fresh air inlet damper through a connecting member, such that the first separating member damper and the fresh air inlet damper moves simultaneously.

Aspect 13. An air circulation circuit, comprising
an air return connection disposed downstream of an indoor space, the air return connection being configured to deliver an air stream from the indoor space to an economizer,
the economizer disposed downstream of the air return connection, the economizer further including,
  an economizer plenum,
  a partition member separating the economizer plenum into a return chamber and a mixing chamber, the return chamber and the mixing chamber being fluidically connected,
  a return air fan disposed within the return chamber, the return air fan facilitating a flow of the air stream,
  an air return inlet disposed within the return chamber,
  an air exhaust outlet disposed within the return chamber,
  an air supply outlet disposed within the mixing chamber, and
  a fresh air inlet disposed within the mixing chamber.
an air conditioning unit disposed downstream of the economizer, the air conditioning unit being configured to provide a treatment to the air stream, and
an air supply connection disposed downstream of the air conditioning unit, the air supply connection being configured to deliver the air stream from the air conditioning unit to the indoor space.

Aspect 14. The air circulation circuit according to aspect 13, wherein
the partition member includes an angled section such that the return chamber and the mixing chamber overlap to each other in a flow direction of the air stream.

Aspect 15. The air circulation circuit according to any one of aspects 13-14, wherein
the air exhaust outlet and the fresh air inlet overlap to each other in the flow direction of the air stream.

Aspect 16. The air circulation circuit according to any one of aspects 14-15, wherein the partition member further includes
a first separating member disposed inside of the economizer plenum, and
a second separating member disposed inside of the economizer plenum,
wherein the first separating member and the second separating member joined together at the angled section.

Aspect 17. The air circulation circuit according to any one of aspects 14-16, wherein
the angled section includes an angle from ~90 degree to ~180 degree.

Aspect 18. The air circulation circuit according to any one of aspects 13-17, wherein
the air return connection further includes an indoor air return opening, the indoor air return opening is configured to allow the air stream to flow from the indoor space to the air return connection.

Aspect 19. The air circulation circuit according to any one of aspects 13-18, wherein
the treatment is one selected from heating, cooling, dehumidifying, filtering, and disinfecting the air stream.

Aspect 20. The air circulation circuit according to any one of aspects 13-19, wherein
the air supply connection further includes an indoor air supply opening, the indoor air supply opening allows the air stream to flow from the air supply connection to the indoor space.

Aspect 21. A method to conduct air circulation, comprising following steps:
receiving an air stream from an indoor space to an economizer plenum,
facilitating a flow of the air stream with an air return fan, the air return fan being disposed in a return chamber of the economizer plenum,
exhausting a portion of the air stream out of the economizer plenum from the return chamber,
directing fresh air to mix with the air stream within a mixing chamber the economizer plenum,
delivering the air stream from the mixing chamber of the economizer to an air conditioning unit for treatment, and
delivering the air stream to the indoor space,
wherein the return chamber and the mixing chamber overlap with each other within the economizer plenum in a flow direction of the air stream.

Aspect 22. The method to conduct the air circulation according to aspect 21,
wherein the air return fan being mounted at the bottom of the economizer plenum.

Aspect 23. The method to conduct the air circulation according to aspect 21-22,
wherein the air return fan being mounted at the back side of the economizer plenum.

Aspect 24. The method to conduct the air circulation according to aspect 21-23,
wherein the step of exhausting a portion of the air stream out of the economizer plenum from the return chamber includes,
  separating the economizer plenum into the return chamber and the mixing chamber, the return chamber and the mixing chamber being fluidically connected, and
  disposing an air exhaust outlet within the return chamber, the air exhaust outlet being configured to allow the air stream to be exhausted out of the economizer plenum.

Aspect 25. The method to conduct the air circulation according to any one of aspects 21-24, wherein the step of directing fresh air to mix with the air stream within the mixing chamber the economizer plenum further includes, separating the economizer plenum into a return chamber and a mixing chamber with a partitioning member that includes an angled section, the return chamber and the mixing chamber being fluidically connected, and disposing a fresh air inlet within the mixing chamber, the fresh air inlet being configured to allow the fresh air to enter the mixing chamber and mix with the air stream within the mixing chamber.

Aspect 26. The method to conduct the air circulation according to any one of aspects 21-25, wherein the treatment is at least one selected from the following: cooling, heating, dehumidifying, filtering, and disinfecting.

Aspect 27. The method to conduct the air circulation according to any one of aspects 21-26, wherein the step of delivering the air stream to the indoor space further includes, facilitating a flow of the air stream with an air supply fan disposed downstream of the economizer plenum.

The invention claimed is:
1. An economizer, comprising:
an economizer plenum,
a partition member separating the economizer plenum into a return chamber and a mixing chamber, the return chamber and the mixing chamber being fluidically connected,
a return air fan disposed within the return chamber,
an air return inlet disposed within the return chamber,
an air exhaust outlet disposed within the return chamber and on a first wall of the economizer plenum,
an air supply outlet disposed within the mixing chamber, and
a fresh air inlet disposed within the mixing chamber and on a second wall of the economizer plenum, the second wall opposing the first wall, and the second wall being parallel to the first wall,
wherein the partition member includes an angled section with angle α,
the angle α is configurable to allow variable placement of the fresh air inlet so that the air exhaust outlet and the fresh air inlet overlap each other along the length direction of the first wall and of the second wall to obtain compactness of the economizer plenum.

2. The economizer according to claim 1, wherein
the angle α is configured to a degree more than 90° and less than 180°.

3. The economizer according to claim 2, wherein the partition member further includes
a first separating member disposed inside of the economizer plenum, and
a second separating member disposed inside of the economizer plenum,
wherein the first separating member and the second separating member are joined together at the angled section.

4. The economizer according to claim 3, further comprising
a first separating member opening disposed on the first separating member, the first separating member opening allows the air stream to flow from the return chamber to the mixing chamber,
a first separating member damper aligned to the first separating member opening, the first separating member damper configured to regulate the air stream flowing through the first separating member opening.

5. The economizer according to claim 4, wherein
the first separating member damper is connected to a fresh air inlet damper through a connecting member, such that the first separating member damper and the fresh air inlet damper moves simultaneously.

6. The economizer according to claim 1, further comprising
an air exhaust outlet damper, the air exhaust outlet damper being aligned to the air exhaust outlet to regulate the air stream flowing through the air exhaust outlet, and
an air exhaust outlet damper motor, the air exhaust outlet damper motor being configured to control a movement of the air exhaust outlet damper.

7. The economizer according to claim 1, further comprising
an air exhaust outlet housing, the air exhaust outlet housing being aligned to the air exhaust outlet, the air exhaust outlet housing being configured to attach to an outside surface of the economizer plenum.

8. The economizer according to claim 1, further comprising
a fresh air inlet damper, the fresh air inlet damper being aligned to the fresh air inlet to regulate the air stream flowing through the fresh air inlet, and
a fresh air inlet damper motor, the fresh air inlet damper motor being configured to control a movement of the fresh air inlet damper.

9. The economizer according to claim 1, further comprising
a fresh air inlet housing, the fresh air inlet housing being aligned to the fresh air inlet, the fresh air inlet housing being configured to attach to an outside surface of the economizer plenum.

10. The economizer according to claim 1, further comprising
an air supply outlet rack connected to the mixing chamber, and
an air filtering member disposed on the air supply outlet rack.

11. An air circulation circuit, comprising:
an air return connection disposed downstream of an indoor space, the air return connection being configured to deliver an air stream from the indoor space to an economizer, the economizer disposed downstream of the air return connection, the economizer including,
an economizer plenum,
a partition member separating the economizer plenum into a return chamber and a mixing chamber, the return chamber and the mixing chamber being fluidically connected,
a return air fan disposed within the return chamber, the return air fan facilitating a flow of the air stream,
an air return inlet disposed within the return chamber,
an air exhaust outlet disposed within the return chamber and on a first wall of the economizer plenum,
an air supply outlet disposed within the mixing chamber, and
a fresh air inlet disposed within the mixing chamber, and on a second wall of the economizer plenum, the second wall opposing the first wall, and the second wall being parallel to the first wall,
wherein
the partition member includes an angled section with angle α, and the angle α is configurable to allow variable placement of the fresh air inlet so that the air exhaust outlet and the fresh air inlet overlap each other along the length direction of the first wall and of the second wall to obtain compactness of the economizer plenum, an air conditioning unit disposed downstream of the economizer, the air conditioning unit being configured to provide a treatment to the air stream, and an air supply connection disposed downstream of the air conditioning unit, the air supply connection being configured to deliver the air stream from the air conditioning unit to the indoor space.

12. The air circulation circuit according to claim 11, wherein
the angle α is configured to a degree more than 90° and less than 180°.

13. The air circulation circuit according to claim 12, wherein the partition member further includes
a first separating member disposed inside of the economizer plenum, and
a second separating member disposed inside of the economizer plenum,
wherein the first separating member and the second separating member joined together at the angled section.

14. The air circulation circuit according to claim 11, wherein
the air return connection further includes an indoor air return opening, the indoor air return opening is configured to allow the air stream to flow from the indoor space to the air return connection.

15. The air circulation circuit according to claim 11, wherein
the air supply connection further includes an indoor air supply opening, the indoor air supply opening allows the air stream to flow from the air supply connection to the indoor space.

16. A method to conduct air circulation, comprising:
receiving an air stream from an indoor space to an economizer plenum having a partition member separating the economizer plenum into a return chamber and a mixing chamber, the return chamber and the mixing chamber being fluidically connected,
facilitating a flow of the air stream with an air return fan, the air return fan being disposed in the return chamber of the economizer plenum,
exhausting a portion of the air stream out of the economizer plenum from the return chamber,
directing fresh air to mix with the air stream within the mixing chamber of the economizer plenum,
delivering the air stream from the mixing chamber of the economizer to an air conditioning unit for treatment, and
delivering the air stream to the indoor space,
wherein
the economizer plenum further comprises an air exhaust outlet disposed within the return chamber and on a first wall of the economizer plenum, and a fresh air inlet disposed within the mixing chamber and on a second wall of the economizer plenum, the second wall opposes and is parallel to the first wall,
the partition member includes an angled section with angle α, and
the angle α is configurable to allow variable placement of the fresh air inlet so that the air exhaust outlet and the fresh air inlet overlap each other along the length direction of the first wall and of the second wall to obtain compactness of the economizer plenum.

17. The method to conduct the air circulation according to claim 16,
wherein the air return fan being mounted at the bottom or back side of the economizer plenum.

18. The method to conduct the air circulation according to claim 16,
wherein exhausting a portion of the air stream out of the economizer plenum from the return chamber includes
disposing an air exhaust outlet within the return chamber, the air exhaust outlet being configured to allow the air stream to be exhausted out of the economizer plenum.

19. The method to conduct the air circulation according to claim 16,
wherein directing fresh air to mix with the air stream within the mixing chamber the economizer plenum further includes
disposing the fresh air inlet within the mixing chamber, the fresh air inlet being configured to allow the fresh air to enter the mixing chamber and mix with the air stream within the mixing chamber.

20. The method to conduct the air circulation according to claim 16,
wherein the treatment is at least one selected from the following: cooling, heating, dehumidifying, filtering, and disinfecting.

21. The method to conduct the air circulation according to claim 16,
wherein the step of delivering the air stream to the indoor space further includes,
facilitating a flow of the air stream with an air supply fan disposed downstream of the economizer plenum.

* * * * *